June 7, 1949.  R. P. ALLEN  2,472,057
APPARATUS FOR THE TREATMENT OF FABRICS
Filed Nov. 20, 1945  2 Sheets-Sheet 1

INVENTOR.
RAYMOND P. ALLEN
BY

Patented June 7, 1949

2,472,057

UNITED STATES PATENT OFFICE 2,472,057

APPARATUS FOR THE TREATMENT OF FABRICS

Raymond P. Allen, Akron, Ohio, assignor to Seiberling Rubber Company, Barberton, Ohio, a corporation of Delaware Application November 20, 1945, Serial No. 629,802

7 Claims. (Cl. 91—17)

This invention relates to apparatus for the drying of fabrics under controlled tension after dipping in an aqueous medium. The invention will be described more particularly as applied to the drying of tire fabrics, both cord fabric and square-woven fabric.

The dipping of tire cord fabrics in aqueous dispersions of rubber, such as rubber latices or dispersions of reclaimed rubber together with other materials, such as casein, prior to calendering rubber onto them to cause adhesion of the rubber to the fabric is quite generally employed because of the superior adhesion thereby secured between, for example, rayon and synthetic rubbers. When natural rubber was available, no adhesive was usually required to bond it to cotton fabric: the "whiskers" of the cotton became anchored in the rubber during the calendering operation, and there was little or no danger of subsequent separation of the rubber from the cotton after vulcanization. Rayon fibers (the term being used herein to refer generally to synthetic fibers regardless of their composition) are smooth surfaced and must be treated with an adhesive before calendering to obtain satisfactory adhesion. Likewise, before calendering with a synthetic rubber, such as GR-S (rubber-like copolymer of butadiene-1,3 and styrene), any fabric—even cotton—may be treated advantageously with an adhesive to secure satisfactory adhesion.

Aqueous dispersions of rubber (either rubber latex or reclaim dispersions or both) together with other materials such as casein or resorcinol-formaldehyde are used quite universally on tire fabrics and are applied by dipping the fabric into them. These dispersions contain sufficient water to thoroughly "wet out" the fabric and thereby cause appreciable shrinkage. Since this shrinkage is undesirable for attaining the optimum properties of cord fabric, such shrinkage should be prevented in the treatment of cord fabric by maintaining it under tension during the period between wetting and final drying. If allowed to shrink, the fabric loses tensile strength and gains elongation; furthermore, if shrinkage were allowed to occur, the fabric would not shrink evenly, and this would cause difficulty in the subsequent operations of calendering, etc.

However, not all fabrics are dried under high tension. So far the discussion has related to tire cord fabric where the strength of the fabric resides mainly in the warp cords and where any filler is a light cotton cord woven in only for the purpose of keeping the warp cords in position and alignment. Square-woven cotton or rayon fabric, which require strength in both directions and in which, therefore, the warp and filler cords are substantially equal in end count and strength, also may be dipped; but because of the construction of this fabric, it may be desirable to decrease greatly the tension of this type of fabric during the drying period. If square-woven fabric were subjected to longitudinal tension during drying, the crimp in the warp threads would be decreased, and the crimp in the woof threads would be increased. The end count in the warp and woof of the fabric would then be changed. In order that such square-woven fabric retain its original properties, it must be substantially free of tension in the period from dipping through drying.

By means of the device which is the subject of this invention, it is easily possible to decrease the tension even to the point where zero tension may be applied.

According to this invention a stalled torque motor is employed to maintain tension on wet fabric between the wetting and drying steps of any fabric treatment, and more particularly in the treatment of tire cord fabrics and the like where very appreciable tensioning power is required. The tensioning effect of the stalled torque motor may supplement or be supplemented by a weighted bar under (or over) which the fabric passes. In a preferred arrangement in which both a torque motor and other weighting means supplement one another, the motor is connected with reversing means so that when the direction of rotation of the motor is reversed, the tensioning action of the motor and other weighting means will in part or wholly counteract one another. By having the two fully counteract one another, any fabric being treated may be dried under substantially zero tension.

To illustrate the latter: If half the tensioning power required for rayon tire fabric is supplied by the stalled torque motor, and the other half is supplied by weights, it is possible by reversing the motor to cause the two tensioning means to counteract one another. Thus, by merely throwing a switch, and without the handling or adjustment of weights, equipment which has been used for tensioning rayon fabric may be used for drying square-woven fabric in the absence of tension.

The invention will be further described in connection with the accompanying drawings, in which.

Figure 3:
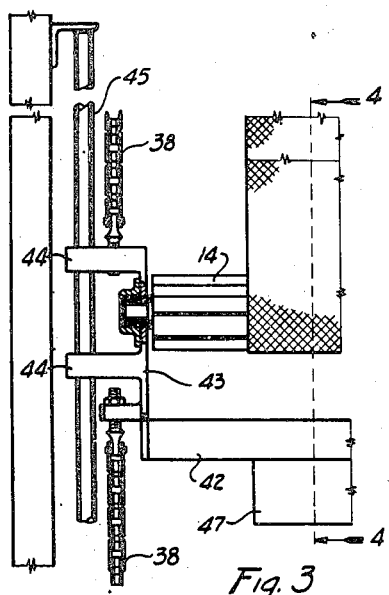
Fig. 3 is an enlarged detail of one end of the weighted carriage showing how it is mounted and how the chain drive is fastened to it.
Figure 4:
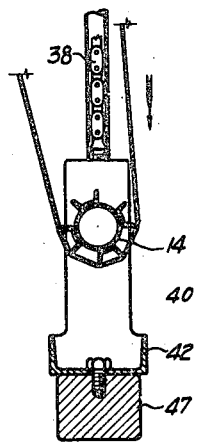
Fig. 4 is a section through the detail on the line 4—4 of Fig. 3.
Figure 1:
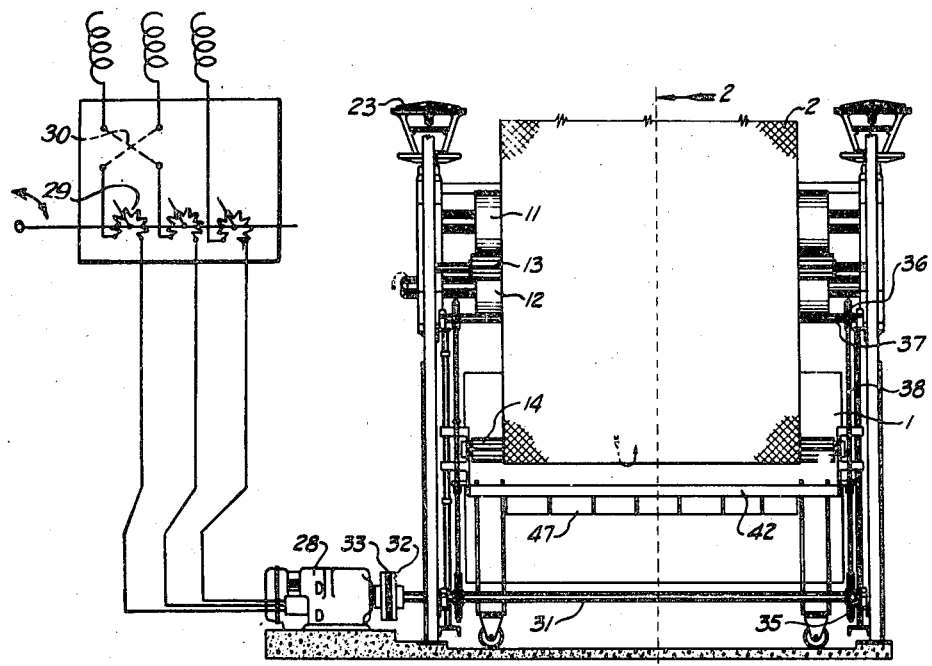
Fig. 1 is an end view of dipping equipment and squeeze rolls showing the fabric on the way to the drier.
Figure 2:
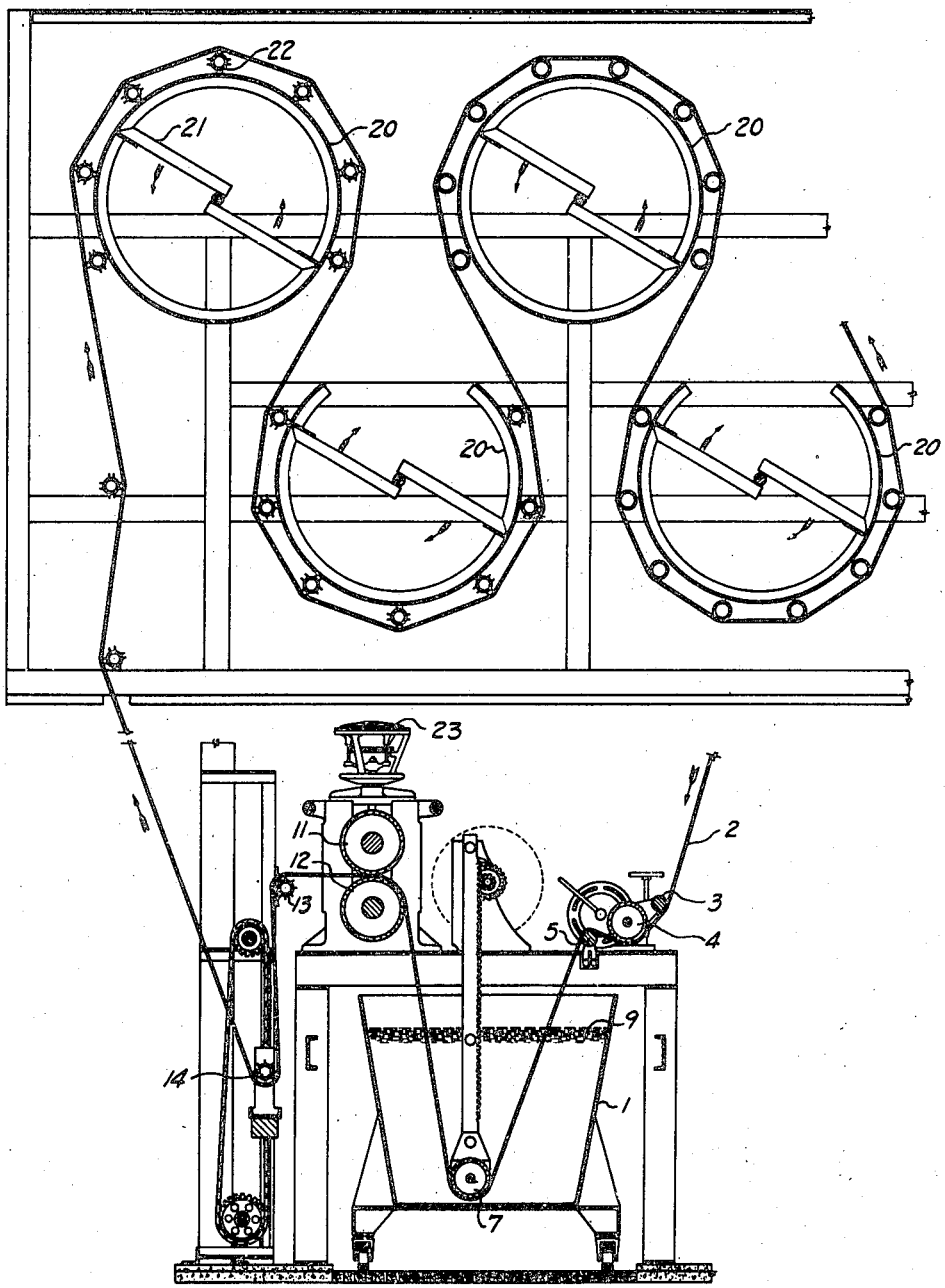
Fig. 2 is a section on the line 2—2 of Fig. 1 and includes a section of a portion of the drying equipment utilized.

The dip tank 1 is of any usual type and is mounted on rollers as indicated. The fabric 2 enters the dip tank from a feeding festoon of the usual type, passing under the rolls 3 and 4 and over the roll 5. The roll 4 has oppositely spiraled fins on its surface to smooth out any wrinkles in the fabric. The fabric passes under the roll 7 which is submerged below the liquid level 9. From the dipping tank it passes through the squeeze rolls 11 and 12, over the star roll 13, down under the weighted star roll 14, and then to the drier. The roll 14 is freely rotatable and by being movable up and down is in effect movable lineally with respect to both the dipping tank and the drier. The drier may be located on the same level as the dip tank but is advantageously located on an upper floor. In practice, the drums 20 of the drier may be about twice the relative diameter indicated in Fig. 1. Fans 21 may be revolved within them, preferably in the direction opposite to the direction of the movement of the fabric. The drums provide support for the rotating star rollers 22 on which the fabric is supported and carried in this part of the drier. The drums are slotted so that the fans blow the air through the cylindrical walls of the drums and thence through the fabric. Suitable means for driving the drums or rollers will be provided as required. (In actual practice, the rollers 22 of the first two drums are not driven but are turned by the fabric as it passes over them, and the rollers of the succeeding drums are all driven at the same constant speed.) There is nothing novel about this drying equipment insofar as it related to this invention.

The friction of the fabric on the drums (or rollers) as the fabric is being pulled forward by suitable means prevents backsliding of the fabric during drying. The weighted carriage 14 prevents retraction between the squeeze rolls 11 and 12 and the drier. Pressure is applied at the squeeze rolls by the usual pneumatic diaphragm arrangement indicated at 23.

The motor 28 is an alternating current motor built to operate at 2200 volts. It is connected, however, to a 440-volt three-phase line with rheostat 29 in the line which permits reduction of the voltage downward from 440 volts. The reversing switch 30 makes it possible to send the current in the motor in either direction so that it tends to turn either forward or backward as desired. Because of the manner in which it is hooked into the weighted carriage assembly and because of the pull of the fabric, the motor never actually turns more than a small part of a revolution; and after this whole assembly, including the fabric, has reached an equilibrium point, the motor does not turn at all. It is, therefore, in a substantially stalled condition at all times; but it exerts continually on the weighted carriage and therefore on the fabric as long as current is impressed on it a specified torque which either adds to the weight of the carriage if the motor is in the forward condition or subtracts from this weight if it is in a reverse condition.

The motor is connected to a main shaft 31 through the coupling 32 which is of any usual type. The connecting surfaces 33 are covered with leather or other vibration-dampening means. There is a sprocket 35 at each end of the main shaft and a similar sprocket 36 at each end of the secondary shaft 37. The chains 38 pass over the sprockets and are fastened at their respective ends to the top and bottom of the weighted carriage 40. This carriage consists of the channel 42 at the ends of which are welded vertical plates 43 to which, in turn, are welded guides 44 which slide freely on the greased upright bars 45. To the bottom of the channel 42 the weights 47 are attached. The seven weights 47 which are illustrated weigh about 350 pounds total. The end plates 43 also carry the star roll 14 under which the fabric passes in traveling from the dip tank 1 to the drier.

In operation, the fabric 2 is drawn from the feeding festoon by the squeeze rolls 11 and 12 down under the roll 7. The driven rolls of the drier draw the fabric from the squeeze rolls around the weighted roll 14 to the drier. By means of a reversing switch voltage may be impressed on the torque motor 28 so that it tends to turn in either direction. If it operates on the chain 38 in such a direction as to lower the weighted carriage 40, it has the effect of increasing the tension effected by the dead weights 47. If it operates on the chain in the reverse direction so as to lift the weighted carriage, it will counteract the effect on the fabric of all or a part of the weights 47. If the pull of the torque motor on the chain 38 is just equal to the pull of the dead weights, the operation of the motor in one direction doubles the pull of the weights, and in the opposite direction offsets them. The relative pull of the motor and the dead weights may be adjusted in any desired manner, employing the rheostat 29 or other suitable means to vary the voltage applied to the motor and, of course, employing also the reversing switch 30.

As an example of the manner in which the stalled torque motor may be applied to increase advantageously the tension on rayon tire cord during the dipping and drying process, the following may be cited.

With the ordinary tensioning equipment and without the application of the stalled torque motor, a lot of 40 rolls of rayon tire body fabric (cord fabric) showed a loss of 1.64 per cent in yardage upon going through the dipping and drying process. After the installation and application of the stalled torque motor, a lot of 40 rolls of similar fabric showed a loss in yardage of 0.24 per cent, a figure which for practical purposes amounts to substantially zero loss.

The figures of this example deal only with the loss in yardage, and while they show the advantage gained by the use of the stalled torque motor in eliminating a serious loss in yardage, they do not concern themselves directly with the quality of the resulting fabric. This improvement in quality is even more important than the saving in yardage.

In the process of manufacture from viscose solution of the rayon filaments from which the tire cord is twisted and woven, the filaments are stretched in order to orient the molecular fibers of the viscose and impart high tensile strength. To a considerable extent these filaments or these molecular fibers of which the filaments are comprised retain a memory of this stretching, and when they are wet again, they show a pronounced tendency to relax and thereby lose a portion of their orientation and their strength. Hence, the shrinkage and the loss in yardage when the tire cord is wet by an aqueous dispersion under insufficient tension. Furthermore, if the tension is still insufficient between the period of wetting and final drying, some of the strength imparted by the tensilizing process during manufacture is irrecoverably lost.

For example, rayon tire fabric (cord fabric) of a certain design and end count was dipped and dried under a tension insufficient to prevent relaxation of the cords. The bone dry tensile strength had a value of 16.47 pounds, and the elongation at the point of the 10-pound load was 3.45 per cent. A portion of the same roll was then dipped and dried under a tension sufficient to prevent relaxation, said tension being applied in the manner of this invention; and the resulting cord showed a tensile strength of 17.20 pounds and an elongation of 2.80 per cent at the 10-pound load.

The application of this invention to provide controlled tension to fabric is not limited to the handling of rayon or even to the handling of any one style of rayon fabric. For example, in many tires there are three styles of rayon fabric used. One style of high end count is used for the body plies of the tire. Another of lower end count is used for the top plies while a third of a still lower end count is used in the breaker of the tire. From the foregoing discussion it is obvious that different tensions must be used on these three fabrics during the dipping and drying operation in order to maintain optimum and uniform properties in these three styles so that the cords in the final tire will show the same strength and elongation. By means of the stalled torque motor which is the essential embodiment of this invention, and having suitable voltage regulation, it is quickly, easily, and accurately possible to provide the correct tension.

Thus, when it is found desirable to vary the tension on the fabric applied by the weights plus the torque motor from time to time as, for example, for the treatment of wider or narrower fabric or for fabric having a greater or lesser total end count or for fabric of different construction or for fabric made from different fibers, the voltage impressed on the motor may be increased or decreased by means of a rheostat so that the exact tension required for developing the optimum physical properties of the fabric may be secured.

Square-woven fabric presents a special problem because the warp and woof cords are substantially equal in strength and in end count. The application of high tension while dipping and drying this fabric may result in distortion both in end count and strength primarily because the warp cords are subjected to high tension while the woof are more free to shrink. Thus, by operating with a dead weight carriage only, there may be an increase in the warp end count by as much as 18 per cent while the woof end count may decrease by 10 per cent. With the easily controlled tension supplied by the stalled torque motor, it is possible to decrease the tension to such a point that the dipped and dried square-woven fabric shows after dipping and drying a more nearly equal warp and woof end count.

Although the invention has been described more particularly in connection with the operation of equipment carrying a dead weight, this is not essential. The torque motor may be used without the dead weights to place a fabric under tension when drying. Other modifications may be made without departing from the scope of the invention as defined in the appended claims.

What I claim is:

1. Means for treating fabric which includes wetting means, drying means, and in line with these, rotatable means around which fabric in passing from the wetting to the drying means is adapted to be looped in such a way as to at least tend to move said rotatable means with respect to the wetting and drying means as the fabric tends to shrink as the result of treatment in the wetting means; and connected with said rotatable means a stalled torque motor connected with a reversible switch and thus adapted to supplement or oppose the movement of the rotatable means with respect to the wetting and drying means.

2. Means for treating fabric which includes wetting means, drying means, and in line with these, weighted rotatable means around which fabric is adapted to be looped in passing from the wetting to the drying means; and connected with said rotatable means a reversible, stalled torque motor which at least aids in maintaining the position of the weighted rotatable means substantially constant with respect to the wetting and drying means.

3. Means for treating tire fabric while spread flat which comprises fabric dipping means with facilities for conveying fabric therethrough while spread flat; drying means which comprises rotatable means of large diameter adapted for the passage of fabric thereover while the fabric is spread flat; and between these, rotatable means over which the fabric is adapted to pass while spread flat, means for supporting said rotatable means in a substantially constant position with respect to the dipping and drying means by means which includes a stalled torque motor.

4. Means for treating fabric which includes wetting means, drying means, and in line with these, freely rotatable tensioning means around which the fabric is looped in passing from the wetting means to the drying means, which freely rotatable means is in effect lineally movable with respect to said wetting and drying means to compensate for variations in the feed of the fabric and means including a stalled torque motor mechanically connected to the rotatable means for maintaining the position of said rotatable means substantially constant whereby the tension on the fabric is controlled and maintained substantially constant.

5. Means for treating tire fabric while spread flat which comprises fabric-dipping means with facilities for conveying fabric therethrough while spread flat; drying means which comprises rotatable means of large diameter adapted for the passage of fabric thereover while the fabric is spread flat; and between these, freely rotatable means of uniform diameter which, in effect, is movable lineally with respect to said dipping and drying means over which the fabric passes while spread flat, and mechanism which includes a stalled torque motor connected with a reversible switch for maintaining said rotatable means in a substantially constant position lineally with respect to said dipping and drying means whereby the tension on the fabric is controlled and maintained substantially constant.

6. Means for treating tire fabric while spread flat which comprises fabric-dipping means with facilities for conveying fabric therethrough while spread flat; drying means which comprises rotatable means of large diameter adapted for the passage of fabric thereover while the fabric is spread flat; and between these, freely rotatable means of uniform diameter which, in effect, is movable lineally with respect to said dipping and drying means over which the fabric passes while spread flat, and mechanism which includes a stalled torque motor connected with a rheostat for maintaining said rotatable means in a substantially constant position lineally with respect to said dipping and drying means whereby the tension on the fabric is controlled and maintained substantially constant.

7. Means for treating tire fabric while spread flat which comprises fabric-dipping means with facilities for conveying fabric therethrough while spread flat; drying means which comprises rotatable means of large diameter adapted for the passage of fabric thereover while the fabric is spread flat; and between these freely rotatable means of uniform diameter which, in effect, is movable lineally with respect to said dipping and drying means over which the fabric passes while spread flat, and mechanism which includes a stalled torque motor connected with a reversible switch and a rheostat for maintaining said freely rotatable means in a substantially constant position lineally with respect to said dipping and drying means whereby the tension on the fabric is controlled and maintained substantially constant.

RAYMOND P. ALLEN.

REFERENCES CITED

The following references are of record in the file of this patent:

UNITED STATES PATENTS

| Number | Name | Date |
| --- | --- | --- |
| 1,697,236 | Gingras | Jan. 1, 1929 |
| 2,197,569 | Kimmick | Apr. 16, 1940 |
| 2,314,996 | Lessig | Mar. 30, 1943 |
| 2,349,290 | Loughborough | May 23, 1944 |